(12) United States Patent
Hancock

(10) Patent No.: US 11,576,521 B2
(45) Date of Patent: Feb. 14, 2023

(54) IN-LINE FLAVOR DISPENSER

(71) Applicant: Mary P. Hancock, Arvada, CO (US)

(72) Inventor: Mary P. Hancock, Arvada, CO (US)

( * ) Notice: Subject to any disclaimer, the term of this patent is extended or adjusted under 35 U.S.C. 154(b) by 612 days.

(21) Appl. No.: 16/550,556

(22) Filed: Aug. 26, 2019

(65) Prior Publication Data
US 2020/0060466 A1 Feb. 27, 2020

Related U.S. Application Data

(60) Provisional application No. 62/723,100, filed on Aug. 27, 2018.

(51) Int. Cl.
| | | |
|---|---|---|
| *A47J 31/40* | (2006.01) | |
| *C02F 1/68* | (2023.01) | |
| *A47G 19/22* | (2006.01) | |
| *B65D 51/28* | (2006.01) | |
| *A47J 31/00* | (2006.01) | |
| *A47G 21/18* | (2006.01) | |
| *A23L 2/56* | (2006.01) | |
| *A47J 31/24* | (2006.01) | |
| *A47J 31/18* | (2006.01) | |
| *B65D 85/804* | (2006.01) | |
| *A47J 31/36* | (2006.01) | |

(52) U.S. Cl.
CPC ............. *A47J 31/407* (2013.01); *A23L 2/56* (2013.01); *A47G 19/2272* (2013.01); *A47G 21/183* (2013.01); *A47J 31/005* (2013.01); *A47J 31/18* (2013.01); *A47J 31/24* (2013.01); *B65D 51/28* (2013.01); *B65D 85/8043* (2013.01); *C02F 1/68* (2013.01); *A47J 31/3676* (2013.01)

(58) Field of Classification Search
CPC .... A47J 31/0605; A47J 31/0642; A47J 31/18; A47J 31/24; A47J 31/3676; A47J 31/407; B65D 85/8043; A47G 21/183; A23L 2/56
USPC .......... 99/323; 206/5, 219; 239/33, 310, 314
See application file for complete search history.

(56) References Cited

U.S. PATENT DOCUMENTS

| | | | | |
|---|---|---|---|---|
| 3,199,682 | A * | 8/1965 | Scholtz | B65D 85/8043 |
| | | | | 426/77 |
| 3,463,361 | A * | 8/1969 | Cook | A47G 21/183 |
| | | | | 222/630 |
| 6,109,538 | A | 8/2000 | Villani et al. | |
| 6,540,070 | B1 | 4/2003 | Conwell | |
| 9,090,395 | B2 | 7/2015 | Koumans | |
| 10,093,479 | B2 * | 10/2018 | Fuchs | B65D 51/2807 |

(Continued)

FOREIGN PATENT DOCUMENTS

WO 03/090565 11/2003

*Primary Examiner* — Reginald Alexander
(74) *Attorney, Agent, or Firm* — Trenner Law Firm, LLC; Mark D. Trenner

(57) ABSTRACT

A device to provide in-line flavor for water or other liquid stored in a container. An example device includes a body having a cylindrical shape chamber formed therein, and an opening on a first end of the body. A cartridge holder fits within the chamber of the body and retains a flavoring therein for the water or other liquid. The cartridge holder has a plurality of openings for the water or other liquid to flow through. When a user drinks from the drinking end, the water or other liquid flows from the container and through the housing and mixes with a flavoring from the cartridge holder before being drawn through to the drinking end so that the user drinks a flavored water or other liquid.

16 Claims, 10 Drawing Sheets

(56) References Cited

U.S. PATENT DOCUMENTS

| | | | |
|---|---|---|---|
| 2003/0072850 A1 | 4/2003 | Burniski | |
| 2004/0188280 A1* | 9/2004 | Young | A61J 7/0038 |
| | | | 206/219 |
| 2004/0253351 A1* | 12/2004 | Killips | A23G 9/24 |
| | | | 426/115 |
| 2010/0012613 A1 | 1/2010 | Anson et al. | |
| 2014/0230659 A1* | 8/2014 | Waggoner | A47J 31/005 |
| | | | 99/323 |
| 2016/0174741 A1* | 6/2016 | Scarbrough | A47G 21/183 |
| | | | 426/85 |
| 2016/0220051 A1 | 8/2016 | Cahoon | |

* cited by examiner

IN-LINE FLAVOR DISPENSER

CROSS REFERENCE TO RELATED APPLICATIONS

This application claims the priority benefit of U.S. Provisional Patent Application No. 62/723,100 filed Aug. 27, 2018 for "In-line Flavor for Container" of Mary Hughes, hereby incorporated by reference in its entirety as though fully set forth herein.

BACKGROUND

Bottles for water or other liquid (e.g., sports drinks) are increasingly popular as more and more people engage in exercise ("work outs") and other physical activities. Sports drinks often contain large amounts of sugar that the user may not want to consume. While plain water is often the top choice, the taste of water can be bland, or even take on an undesirable taste of the container (e.g., a plastic-like taste).

DETAILED DESCRIPTION

An in-line flavor dispenser is disclosed. In an example, the device may improve the taste of the water or other liquid beverage stored in a bladder or other container by adding flavoring to the water or other liquid without adding the flavoring directly into the container. The device enhances the taste of water consumed, e.g., during sports or other physical related activities, such as hiking, skiing, off-road ATV, motocross, and bicycling, just to name a few examples.

In an example, the device may be implemented with hydration bladders to provide flavor options, without contaminating the bladder that could otherwise occur if the flavoring was added directly to the bladder. The device is compact and portable, and works with most bladders and other containers. It is easy to use, easy to clean, and affordable.

Before continuing, it is noted that as used herein, the terms "includes" and "including" mean, but is not limited to, "includes" or "including" and "includes at least" or "including at least." The term "based on" means "based on" and "based at least in part on."

Figure 1:
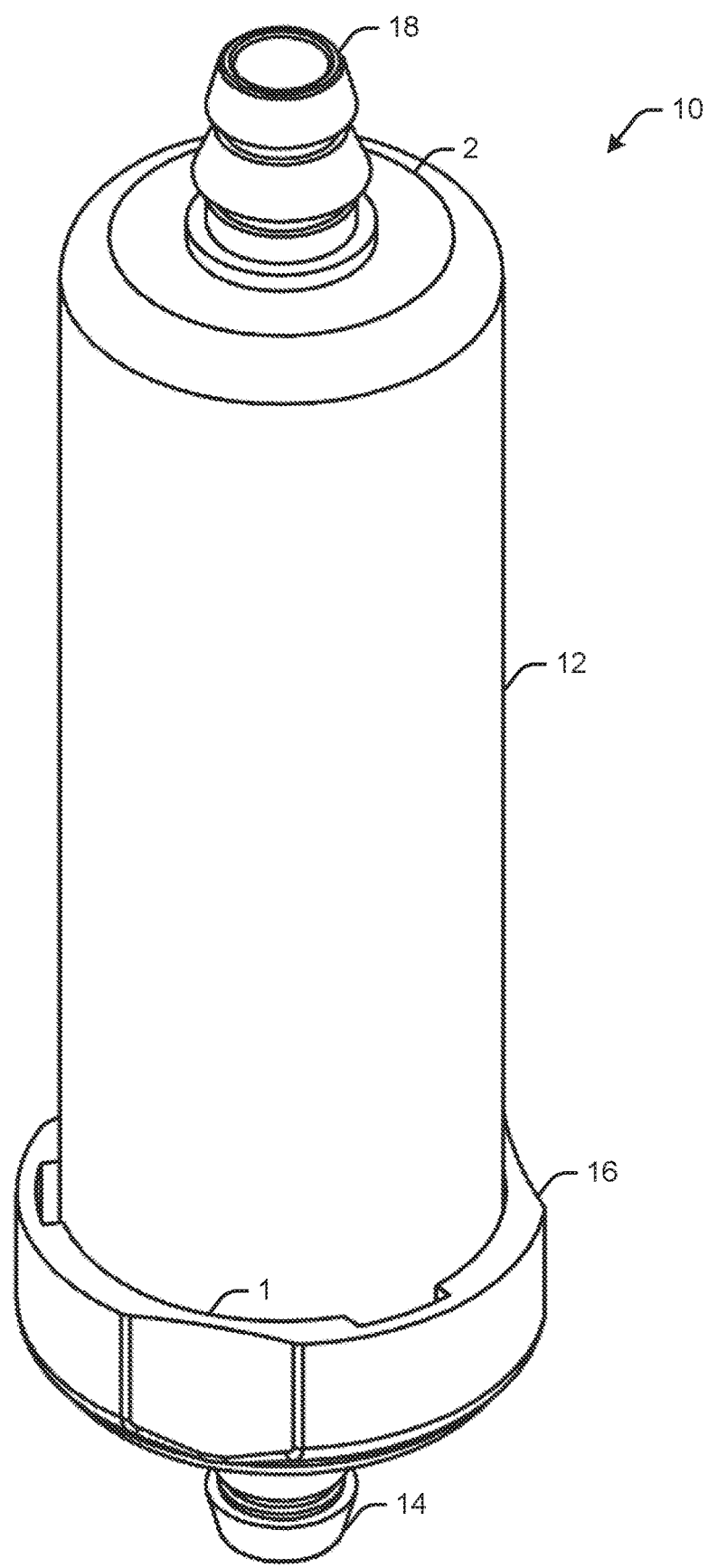
FIG. 1 is a top perspective view of an example in-line flavor dispenser.
Figure 2:
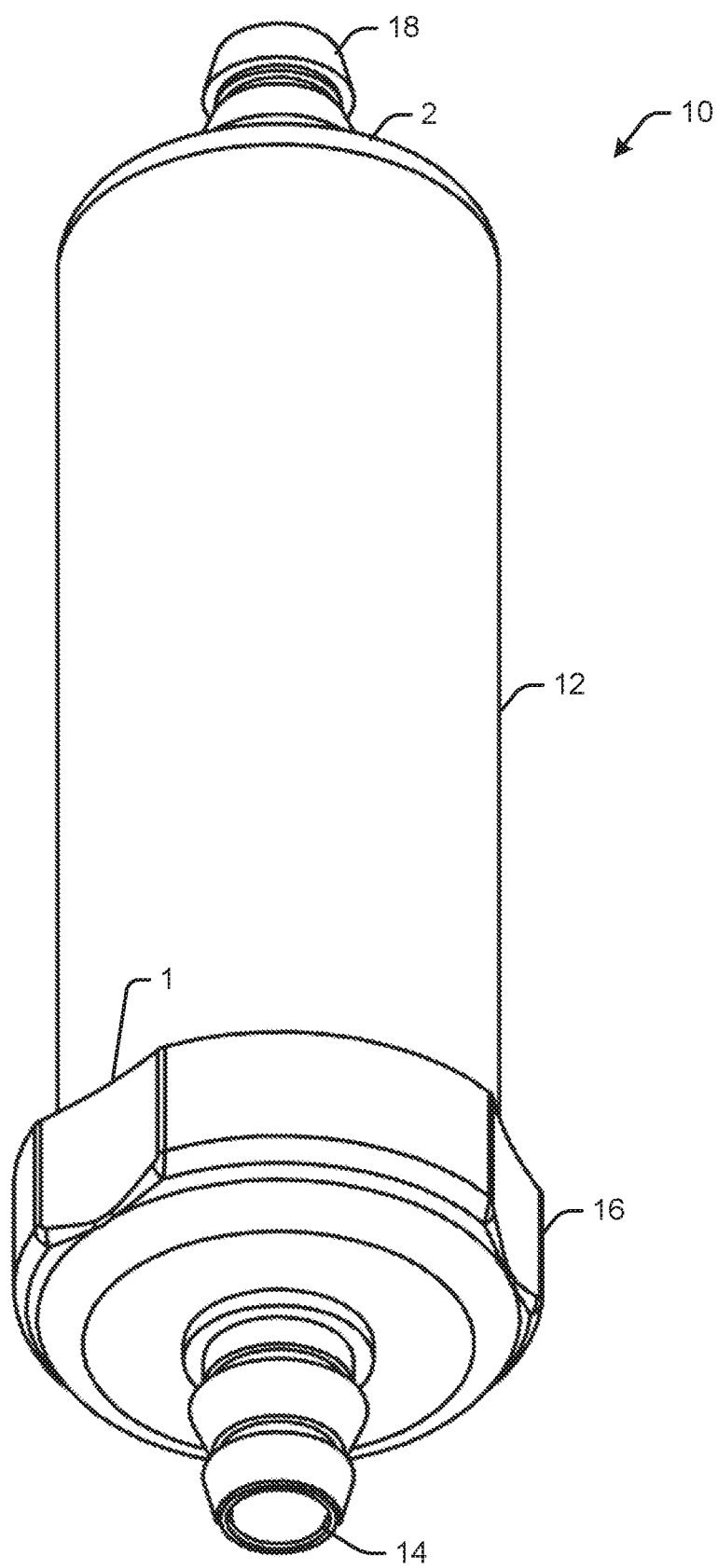
FIG. 2 is a bottom perspective view of the example in-line flavor dispenser in FIG. 1.
Figure 3:
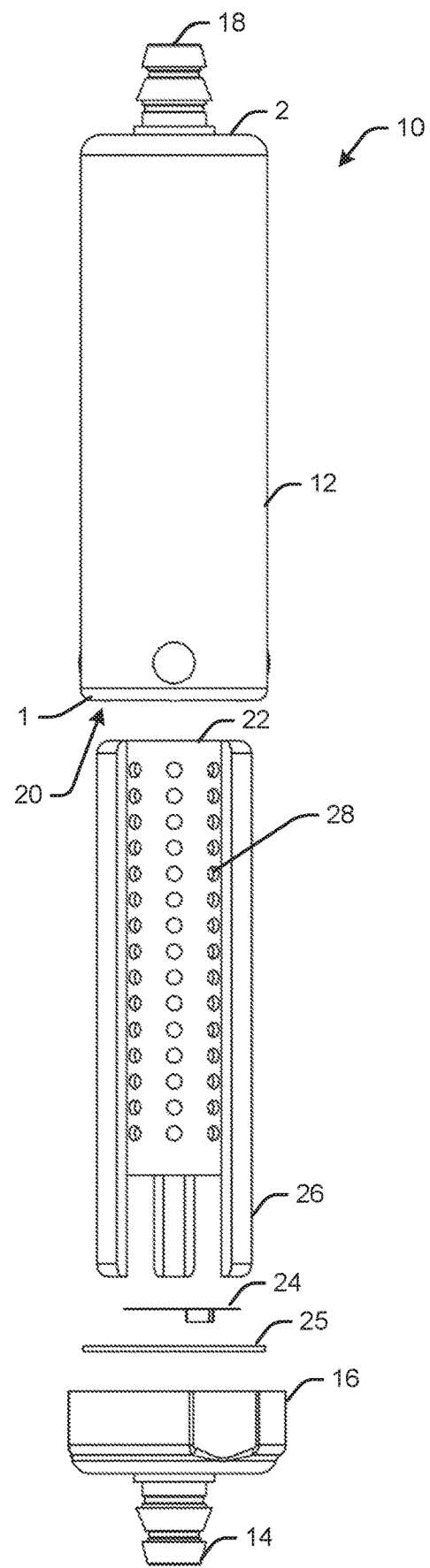
FIG. 3 is an exploded view of the example in-line flavor dispenser.
Figure 4:
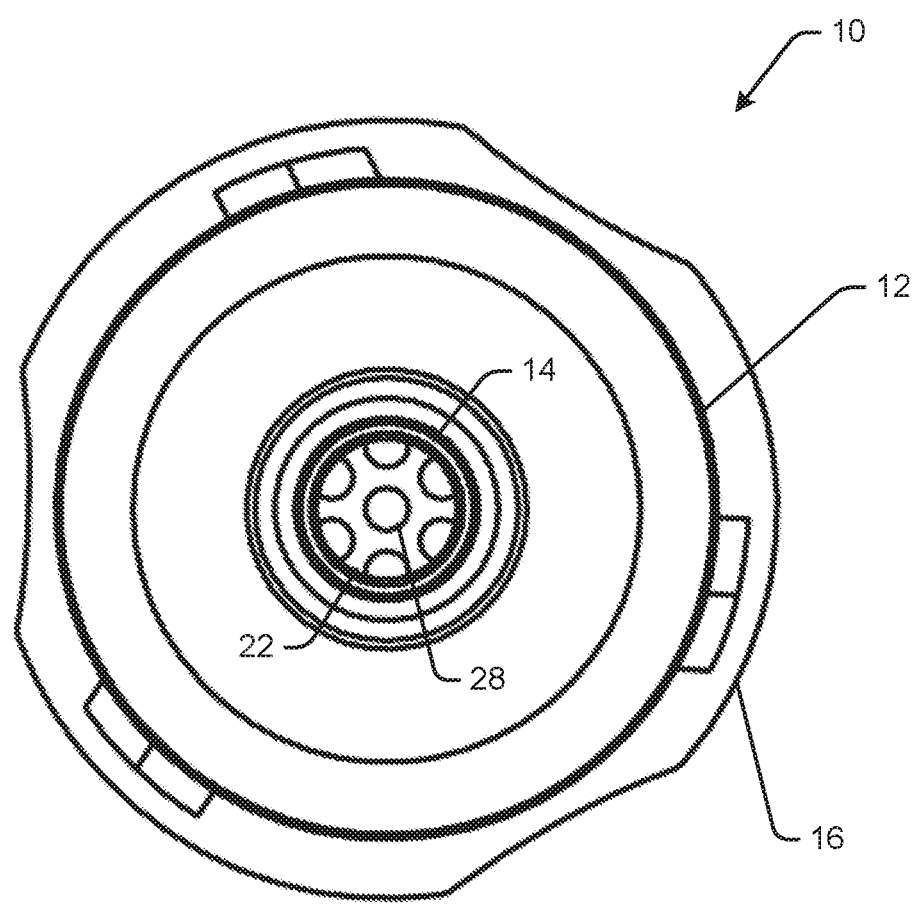
FIG. 4 is a bottom view of the example in-line flavor dispenser.
Figure 5:
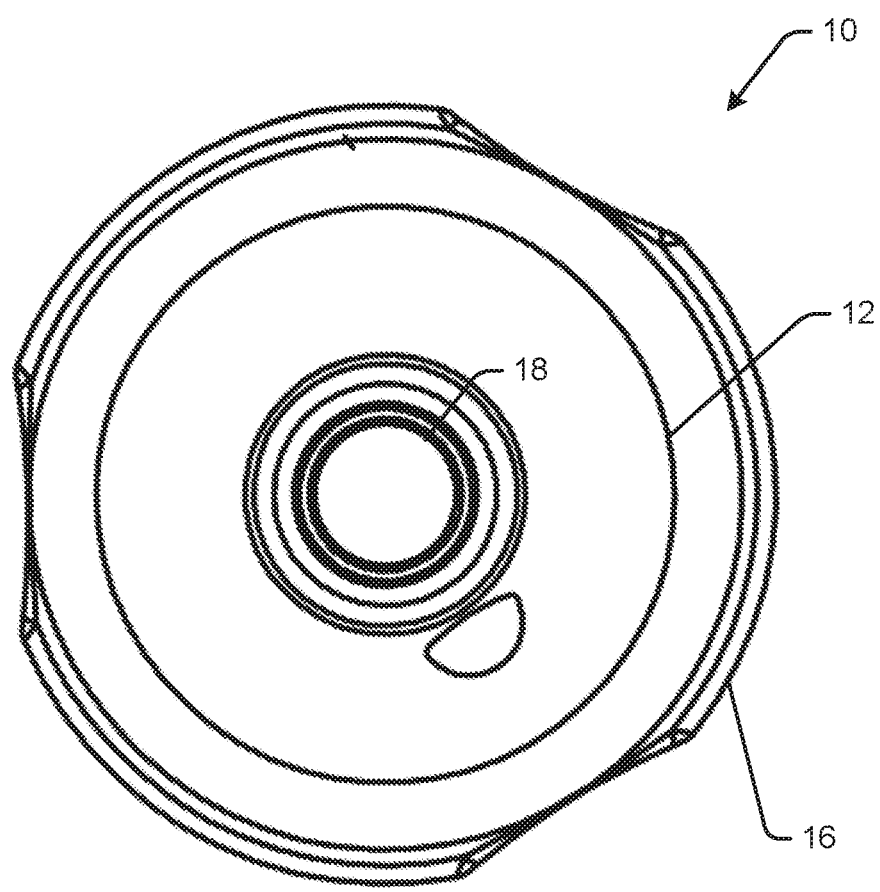
FIG. 5 is a top view of the example in-line flavor dispenser.
Figure 6:
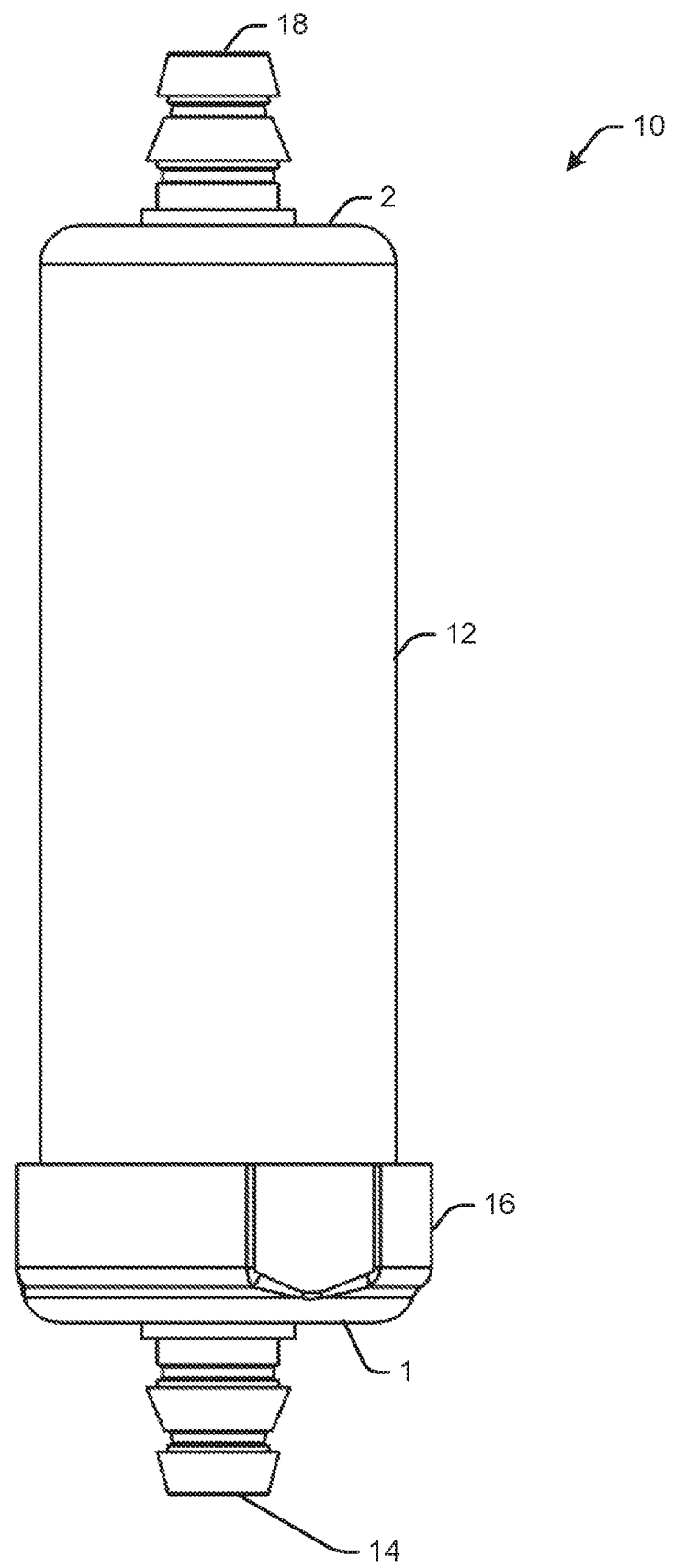
FIG. 6 is a side view of the example in-line flavor dispenser.

FIG. 1 is a top perspective view of an example in-line flavor dispenser 10. FIG. 2 is a bottom perspective view of the example in-line flavor dispenser 10 in FIG. 1. FIG. 3 is an exploded view of the example in-line flavor dispenser 10. FIG. 4 is a bottom view of the example in-line flavor dispenser 10. FIG. 5 is a top view of the example in-line flavor dispenser 10. FIG. 6 is a side view of the example in-line flavor dispenser 10.

In an example, the device includes a body 12 having an inlet 14 in a lid 16, and an outlet 18. A chamber 20 is formed in the body 12 and is configured to receive a flavor pack or cartridge (not shown). In an example, the flavoring or flavor cartridge is placed in a cartridge holder 22.

The flavor pack may be any suitable containment for the flavoring, such as a permeable or semipermeable membrane. The membrane may be similar to a tea bag or metal or composite screen material to retain the flavoring therein in a dry or powdered form, but permit water to flow therethrough. The flavoring may be any suitable form, including but not limited to a powder, crystals, or other soluble form such that it readily mixes with the water or other liquid as water is drawn past the flavor pack in the cartridge holder 22. In another example, the flavoring may be place directly into the cartridge holder 22 (e.g., as flavor crystals or even as a powder if the perforations 28 are sufficiently small to maintain the powder therein).

The inlet 14 may be connected to the container (not shown) so that water or other liquid flows from the container and into the chamber 20 where it is mixed with flavoring in the flavor pack before being suctioned through the outlet 18.

It should be noted that the examples described herein are provided for purposes of illustration, and are not intended to be limiting. Other devices and/or device configurations may be utilized to carry out the operations described herein.

In an example, the device 10 may also include a one-way valve 24 to prevent backflow of the flavored liquid back into the container. A gasket 25 may be provided to seal the lid 16 to the body 12.

In an example, the lid 16 is a removable cap for removing and replacing the flavor pack or cartridge inside of the chamber 20.

In an example, the device 10 may also include a separator 26 to hold the cartridge holder 22 away sides of the inside of the body 12. The separator 26 may also support the cartridge holder 22 away from the lid 16 to prevent the flavor pack from blocking the inlet 14 in the lid 16. The water or other liquid can still flow around and/or through the separator 26.

In an example, the device 10 may be used with any container, including but not limited to a conventional bladder. Any suitable container may be provided. In an example, the liquid is water. But any suitable liquid beverage may be provided.

The device may utilize an FDA approved disposable flavor packs that can be available in a variety of flavors.

During use, the flavor pack/cartridge is inserted into the cartridge holder 22 and the lid or cap 16 may be threaded onto or otherwise connected to the body 12 to close the flavor pack in the cartridge holder 22 in the chamber 20. When suction is applied (e.g., to the bite valve of the drinking end), the water or other liquid is suctioned through the flavor pack in the cartridge holder 22, thereby adding flavor to the water or other liquid to be consumed, before exiting at port 18 for drinking on the drinking end (e.g., through the bite valve).

The operations shown and described herein are provided to illustrate example implementations. It is noted that the operations are not limited to the ordering shown. Still other operations may also be implemented.

Figure 7:
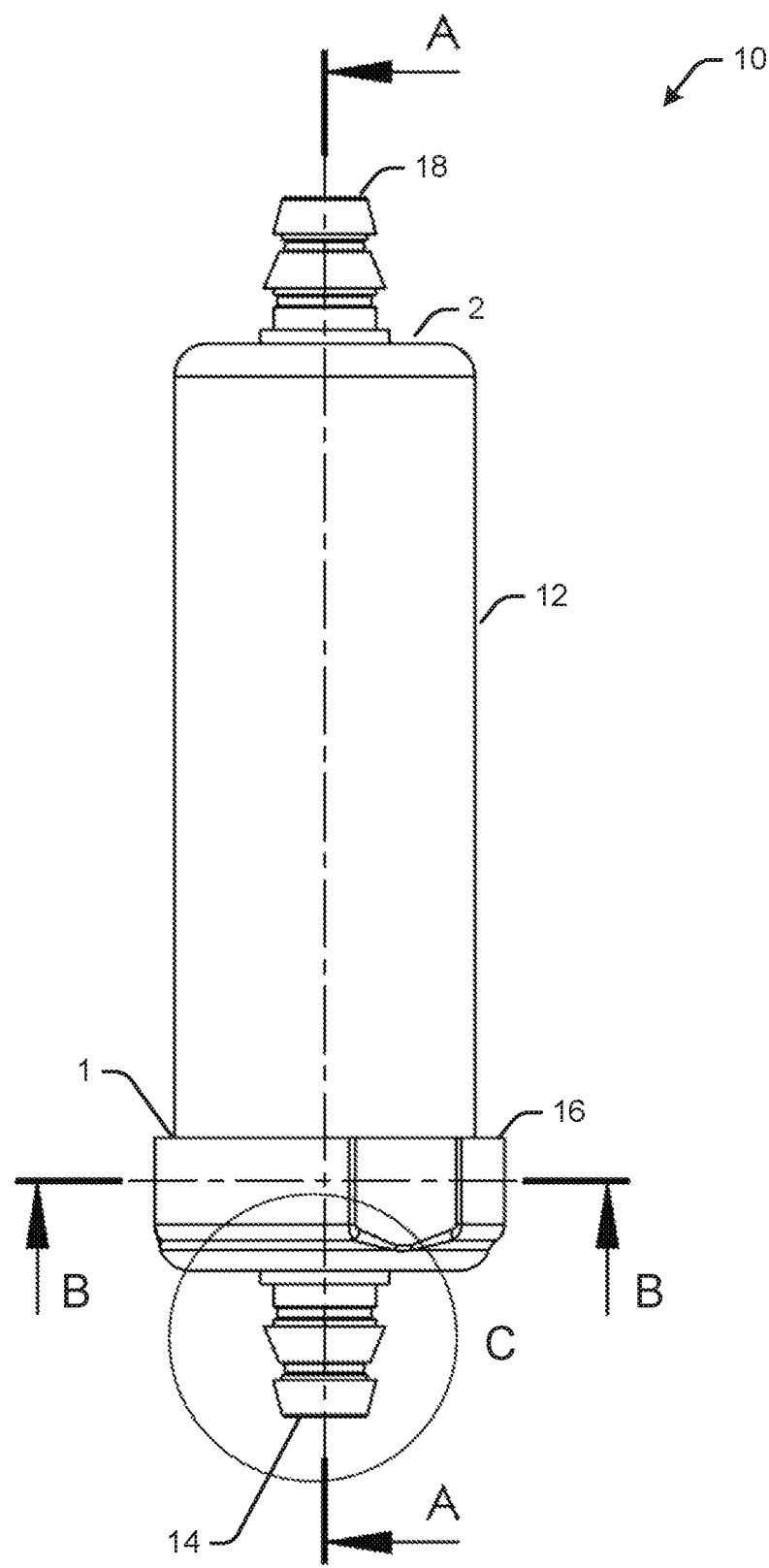
FIG. 7 is another side view of the example in-line flavor dispenser.
Figure 8:
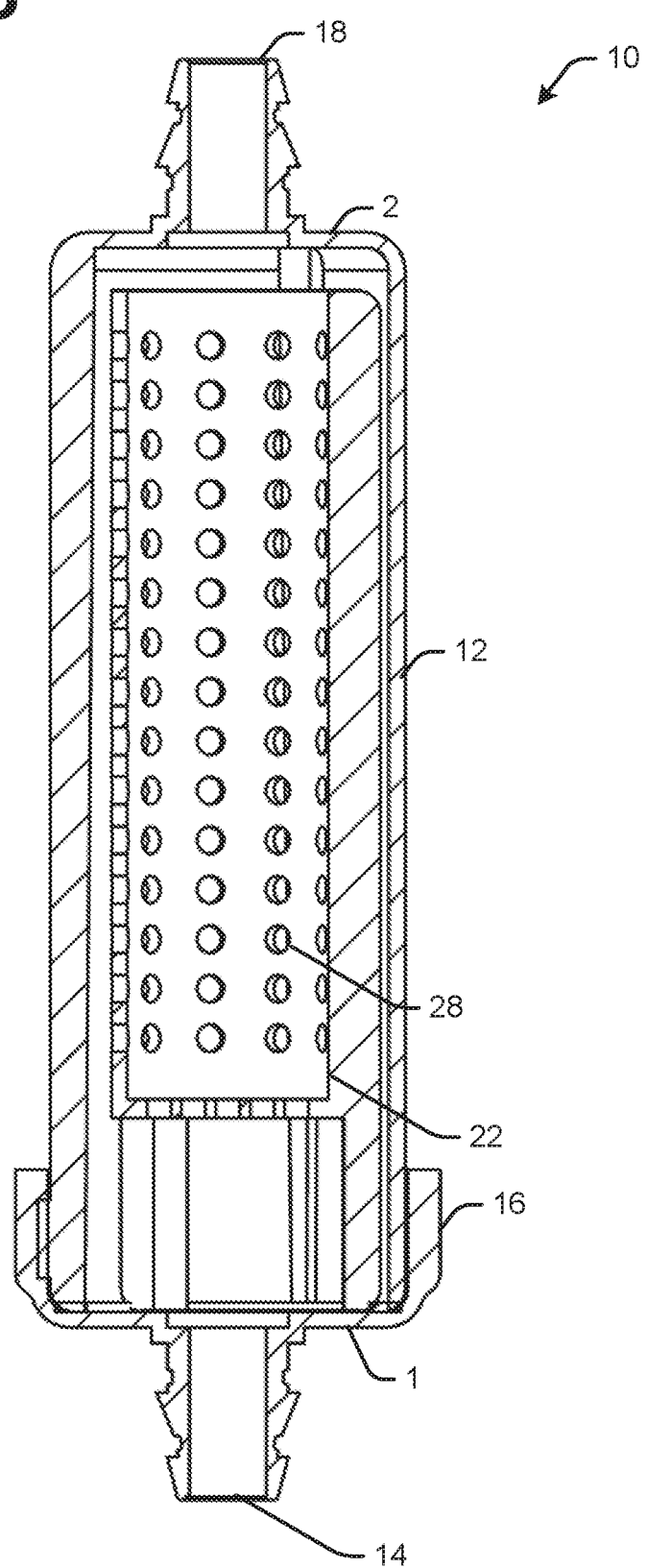
FIG. 8 is a cross-sectional view of the example in-line flavor dispenser taken along lines A-A in FIG. 7.
Figure 9:
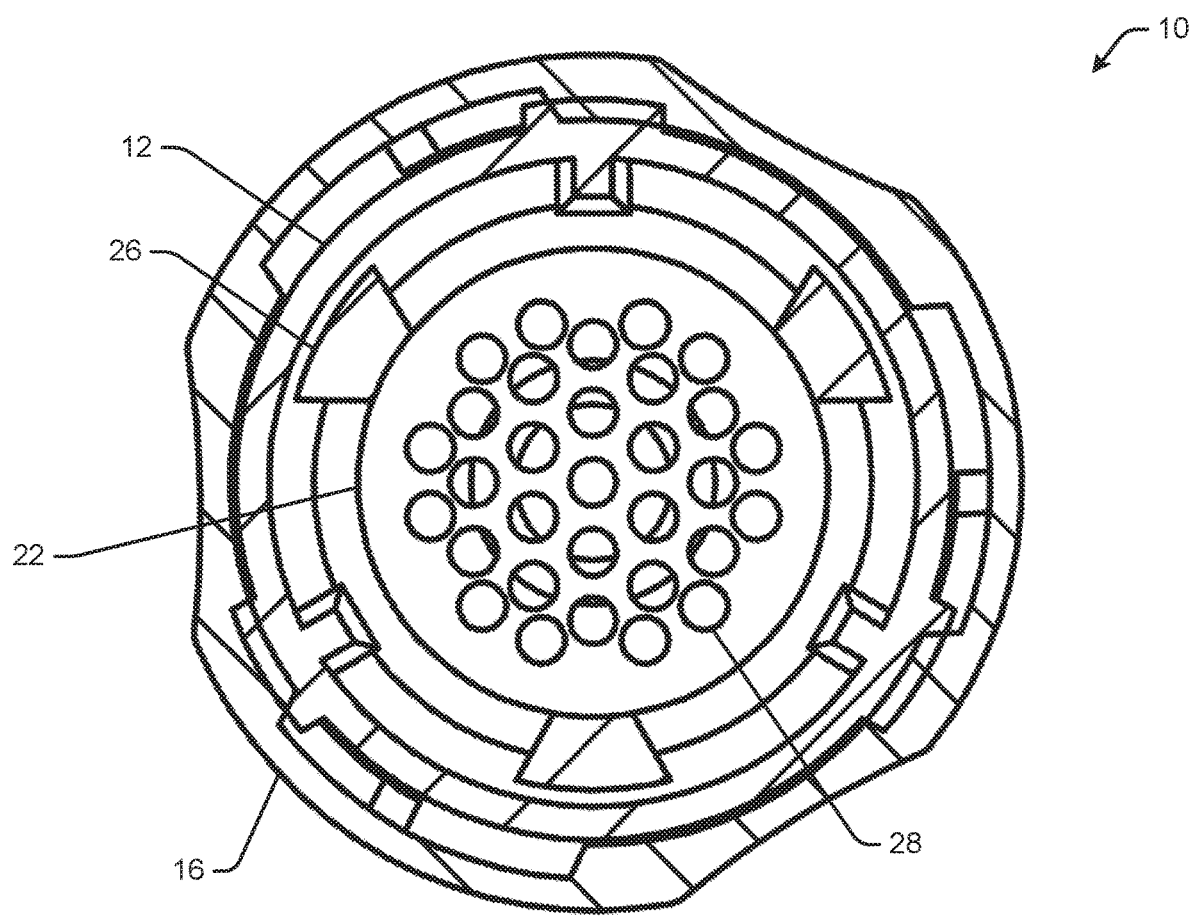
FIG. 9 is a cross-sectional view of the example in-line flavor dispenser taken along lines B-B in FIG. 7.
Figure 10:
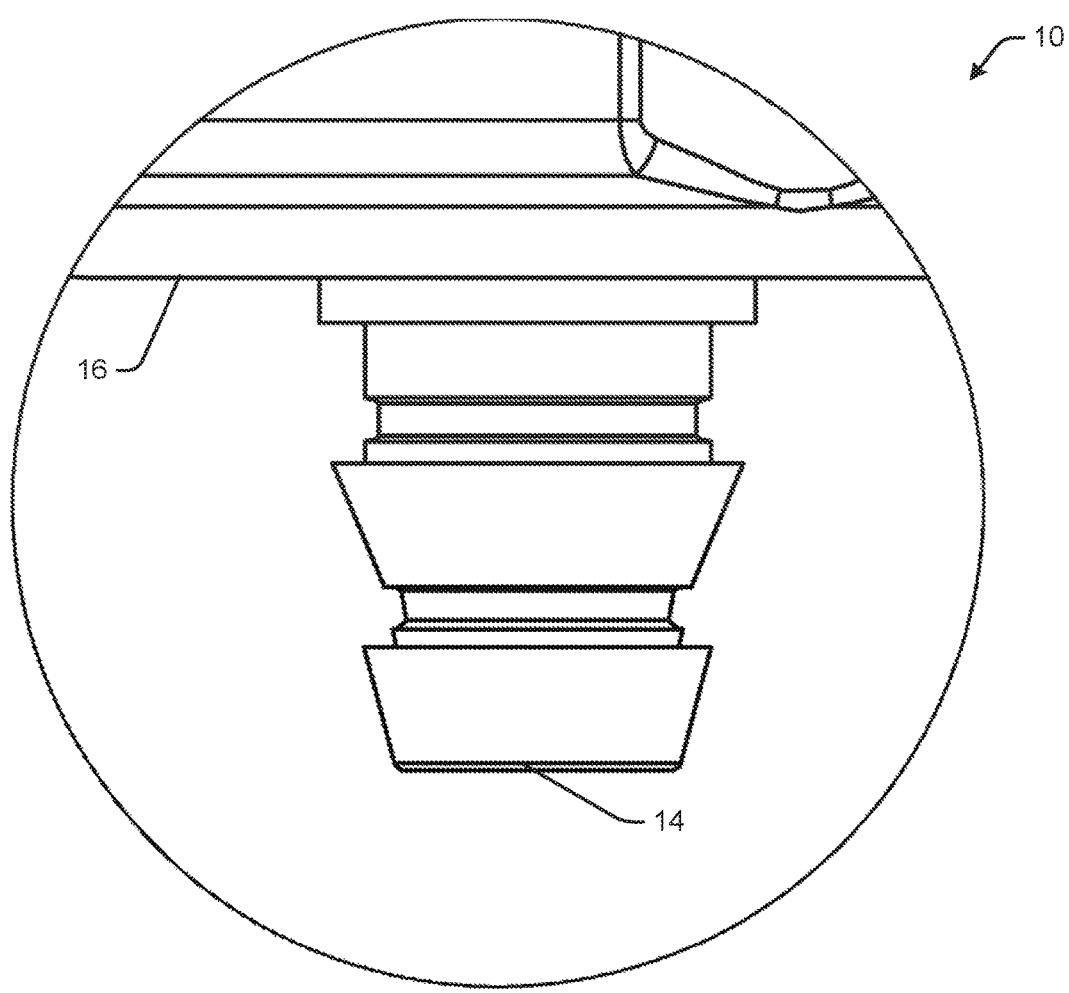
FIG. 10 is a detailed view of the example in-line flavor dispenser taken from section C in FIG. 7.

FIG. 7 is another side view of the example in-line flavor dispenser 10 corresponding FIG. 6, and showing the views of FIGS. 8-10. FIG. 8 is a cross-sectional view of the example in-line flavor dispenser 10 taken along lines A-A in FIG. 7. FIG. 9 is a cross-sectional view of the example in-line flavor dispenser 10 taken along lines B-B in FIG. 7. FIG. 10 is a detailed view of the example in-line flavor dispenser 10 taken from section C in FIG. 7.

In an example, the in-line flavor dispenser device 10 to provide in-line flavor for water or other liquid stored in a container (not shown) includes body 12 having chamber 20 formed therein, and an opening on a first end 1 of the body 12. Lid 16 is provided to open and close the opening on the first end 1 of the body 12. A first port 14 is provided on the lid 16, and a second port 18 is provided on the second end 2 of the body 12. A removable cartridge holder 22 for a flavoring (e.g., provided in a flavor pack) is configured to fit within the chamber 20 of the body 12.

The first port 14 is connected to the container (e.g., a bladder) for the water or other liquid (e.g., via a tubing). The second port 18 is connected to a drinking end (e.g., a tubing or straw with a bite end) so that when a user drinks from the drinking end, the water or other liquid flows (e.g., is suctioned) from the container and through the first port 14 in the lid 16 and is mixed with a flavoring in the cartridge holder 22 before being drawn through the second port 18 to the drinking end so that the user drinks a flavored water or other liquid.

In an example, the device 10 includes a one-way valve 24 to reduce or altogether prevent backflow of the flavoring in the cartridge holder into the container for the water or other liquid.

In an example, the lid 16 is removable from the body 12 to access the cartridge holder 22 in the chamber 20 for replacing one flavor pack with another flavor pack in the cartridge holder 22.

In an example, the device 10 includes a separator 26 between the cartridge holder 22 and the body 12. The separator 26 maintain a position of the cartridge holder 22 in the chamber 20 to prevent blocking the first and/or second ports 14 and 18.

In an example, the cartridge holder 22 is a cylinder and enclosed on one end. This allows flavoring to be added into the cartridge holder 22 on one end, while providing a closed and perforated opposite end. The cartridge holder 22 may be inserted either direction into the chamber 20, but in an example is inserted with the open end toward the second port 18 and the closed end toward the lid 16.

In an example, the cartridge holder 22 is removable from the chamber 20. In another example, the cartridge holder 22 is not removable from the chamber 20.

In an example, the cartridge holder 22 is perforated 28. For example, the cartridge holder 22 may have a plurality of openings for the water or other liquid to flow through and mix with the flavoring as the water or other liquid is drawn through the cartridge holder 22 before exiting through the second port 18.

It is noted that the examples shown and described are provided for purposes of illustration and are not intended to be limiting. Still other examples are also contemplated.

The invention claimed is:

1. A device to provide in-line flavor for water or other liquid stored in a container, comprising:
   a body having a chamber formed therein, and an opening on a first end of the body;
   a lid for the opening on the first end of the body;
   a first port on the lid; and
   a second port on the second end of the body;
   a cartridge holder for adding flavoring to the water or other liquid stored in the container, the cartridge holder configured to fit within the chamber of the body;
   wherein the first port is connected to the container for the water or other liquid, and the second port is connected to a drinking end so that when a user drinks from the drinking end, the water or other liquid flows from the container and through the first port in the lid and is mixed with a flavoring of the flavor pack in the cartridge holder before being drawn through the second port to the drinking end so that the user drinks flavored water or other liquid; and
   wherein the cartridge holder is cylindrical and has a plurality of openings for the water or other liquid to flow through and mix with the flavoring as the water or other liquid is drawn through the cartridge holder before exiting through the second port.

2. The device of claim 1, further comprising a one-way valve to prevent backflow of the flavoring into the container for the water or other liquid.

3. The device of claim 1, wherein the lid is removable from the body to access the cartridge holder in the chamber for replacing one flavor pack with another flavor pack in the cartridge holder.

4. The device of claim 1, further comprising a separator between the cartridge holder and the body, the separator maintaining a position of the cartridge holder in the chamber to prevent blocking the first and second ports.

5. The device of claim 1, wherein the first port is connected to the container by a tubing.

6. The device of claim 1, wherein the second port is connected to the drinking end by a tubing.

7. The device of claim 6, wherein the drinking end has a bite valve.

8. The device of claim 1, wherein the chamber is cylindrical.

9. The device of claim 1, wherein the cartridge holder is perforated.

10. A device to provide in-line flavor for water or other liquid stored in a container, comprising:
    a body having a cylindrical shape chamber formed therein, and an opening on a first end of the body;
    a lid for the opening on the first end of the body;
    a first port on the lid for connecting the body to the container via a supply tubing;
    a second port on the second end of the body for connecting to a drinking end via a drinking tubing; and
    a removable perforated cartridge holder for a flavor pack, the cartridge holder configured to fit within the chamber of the body;
    wherein the first port is connected to the container for the water or other liquid, and the second port is connected to a drinking end so that when a user drinks from the drinking end, the water or other liquid flows from the container and through the first port in the lid and is mixed with a flavoring in the cartridge holder before being drawn through the second port to the drinking end so that the user drinks a flavored water or other liquid.

11. The device of claim 10, further comprising a one-way valve to prevent backflow into the container for the water or other liquid.

12. The device of claim 10, wherein the lid is removable from the body to access the cartridge holder in the chamber for replacing one flavor pack with another flavor pack.

13. The device of claim 10, further comprising a separator between the cartridge holder and the body, the separator maintaining a position of the cartridge holder in the chamber to prevent blocking the first and second ports.

14. The device of claim 10, wherein the cartridge holder has a plurality of openings for the water or other liquid to flow through and mix with the flavoring as the water or other liquid is drawn through the flavor pack in the cartridge holder before exiting through the second port.

15. A device to provide in-line flavor for water or other liquid stored in a container, comprising:
- a body having a cylindrical shape chamber formed therein, and an opening on a first end of the body;
- a cartridge holder configured to fit within the chamber of the body and retain a flavoring therein for the water or other liquid, the cartridge holder having a plurality of openings for the water or other liquid to flow through and mix with the flavoring;
- a lid for the opening on the first end of the body, the lid removable from the body to access the cartridge holder in the chamber for replacing one flavoring with another flavoring in the cartridge holder; and
- a first port on the lid for connecting the body to the container via a supply tubing;
- a second port on the second end of the body for connecting to a drinking end via a drinking tubing;
- wherein the first port is connected to the container for the water or other liquid, and the second port is connected to a drinking end so that when a user drinks from the drinking end, the water or other liquid flows from the container and through the first port in the lid and mixes with the flavoring in the flavor pack, before being drawn through the second port to the drinking end so that the user drinks a flavored water or other liquid.

16. The device of claim 15, further comprising:
- a one-way valve to prevent backflow of the flavoring in the cartridge holder into the container for the water or other liquid; and
- a separator between the cartridge holder and the body, the separator maintaining a position of the cartridge holder in the chamber to prevent blocking the first and second ports.

* * * * *